United States Patent [19]

Ochi et al.

[11] Patent Number: 4,605,974
[45] Date of Patent: Aug. 12, 1986

[54] MAGNETIC RECORDING AND REPRODUCING APPARATUS

[75] Inventors: Atsuo Ochi, Moriguchi; Akio Hashima, Tsuzuki; Masao Tomita, Neyagawa, all of Japan

[73] Assignee: Matsushita Electric Industrial Co., Ltd., Osaka, Japan

[21] Appl. No.: 555,002

[22] Filed: Nov. 21, 1983

[30] Foreign Application Priority Data

Nov. 24, 1982 [JP] Japan .................................. 57-206694
Nov. 24, 1982 [JP] Japan .................................. 57-206695

[51] Int. Cl.[4] .................... G11B 15/12; G11B 15/14
[52] U.S. Cl. ................................. 360/62; 360/64
[58] Field of Search .................... 360/62, 64, 67, 68

[56] References Cited

U.S. PATENT DOCUMENTS 3,673,349 6/1972 Berg et al. ............................ 360/64

FOREIGN PATENT DOCUMENTS 0121714 9/1979 Japan .................................... 360/64

Primary Examiner—Vincent P. Canney
Attorney, Agent, or Firm—Wenderoth, Lind & Ponack

[57] ABSTRACT

A magnetic recording/reproducing apparatus has a rotor drum with a group of rotary magnetic heads mounted thereon, a reproducing amplifier, a recording-/reproducing mode switching circuit, a head selection circuit, a control circuit and a DC voltage source. The control signal circuit and the DC voltage source receive a control signal transmitted from a stator drum through a rotary transformer and produce signals for controlling the mode switching circuit and the head selecting circuit and a DC voltage for energizing all the circuits on the rotor drum, respectively.

7 Claims, 10 Drawing Figures

MAGNETIC RECORDING AND REPRODUCING APPARATUS

BACKGROUND OF THE INVENTION

1. Field of the Invention

This invention relates to a magnetic recording and reproducing apparatus having a rotor drum with a plurality of rotary magnetic head mounted thereon and reproducing amplifiers which are arranged so that recording and reproducing signals can be amplified and switched on the rotor drum.

2. Description of the Prior Art

Recently, magnetic recording and reproducing apparatus have become small-sized, light, efficient and have had convenient functions such as special reproducing mode added, but are not satisfactory to the increasing users demands. The further improvement of the magnetic recording and reproducing apparatus would be difficult using conventional techniques. So, new techniques are expected. Regarding the rotor drum portion, it has become necessary to mount more rotary magnetic heads on the rotor drum for realizing various special reproduction modes, long and high quality recording-/reproducing modes and the so-called "video insert" mode which rewrites recorded video signals.

Conventionally, a rotary transformer is used for signal transmission between the rotary magnetic heads and the stator circuits. The number of the transmitting channels of the rotary transformer must be equal to that of the rotary magnetic heads. Accordingly, if the number of the rotary magnetic heads increases, the size of rotary transformer is large and disturbances to the video signals occur because of cross-talk between adjacent channels. Furthermore, since reproduced signals from the rotary magnetic heads are required to be broad-band for obtaining a high efficiency, the reproducing amplifiers must be placed as closely as possible to the rotary magnetic heads for decreasing stray capacitance.

FIG. 1 shows an example of a conventional magnetic recording and reproducing apparatus. In FIG. 1, elements 1a–1d are rotary magnetic heads, element 9 is a magnetic recording medium such as a magnetic tape. The rotary magnetic heads 1a–1d are coupled to stator circuits through a rotary transformer 3. Elements 2a–2d are channels of the rotary transformer 3 and the broken line shows the group of channels 2a–2d of the rotary transformer 3. Each of the rotary magnetic heads 1a–1d is connected one of the channels 2a–2d of the rotary transformer 3 as shown FIG. 1, which means that the number of channels of the rotary transformer is equal to that of the rotary magnetic heads. The channels 2a–2d of the rotary transformer 3 are coupled to reproducing amplifiers 5a–5d through recording/reproducing mode switching circuits 4a–4d. The reproducing amplifiers 5a–5d are connected to a reproducing head selection circuit 6. The mode switching circuits 4a–4d are further connected to a recording head selection circuit 7 which is connected to a recording amplifier 8.

During the reproducing mode, the mode switching circuits 4a–4d select the reproducing mode by a recording/reproducing mode switching signal. The reproduced signals are transferred to the reproducing amplifiers 5a–5d. The amplified signals are transferred to the reproducing head selection circuit 6 which selects a reproducing magnetic head according to a head selection signal so as to obtain the desired reproduced signal.

During the recording mode, a recording signal amplified by the recording amplifier 8 is transferred to a recording magnetic head which is selected by the recording head selection circuit 7 through one of the mode switching circuits 4a–4d and one of the channels 2a–2d of the rotary transformer 3. The mode switching circuits 4a–4d prevent the recording signal from being transferred to the reproducing amplifiers 5a–5d.

As described above, only a plurality of rotary magnetic heads and one set of windings of the rotary transformer are mounted on the rotor drum, and all signals are processed by the circuits located at the stator side. By this configuration, however, the rotary transformer 3 is usually installed in the cylinder unit and the mode switching circuits 4a–4d and the reproducing amplifiers 5a–5d are installed on a printed circuit board on the stator side together with other circuit blocks. Since the rotary magnetic heads are distant from the printed circuit board, the connection wires between the rotary transformer and the circuits on the printed circuit board are shielded and the stray capacitance is approximately 40–80 pF. Accordingly, the frequency characteristics during the playback mode cannot be wide. In other words, such a conventional example as above is unsuitable for broadening the frequency band of the amplifiers.

Furthermore, the signal loss of the rotary transformer 3 degrades the S/N ratio of the reproduced signal.

Still furthermore, FIG. 1 shows an example using four rotary magnetic heads, but the number of rotary magnetic heads must be increased for the special reproducing mode and the long play-and-audio reproducing modes. Therefore, the number of channels of the rotary transformer will increase and accordingly the size thereof will increase. This means that the number of rotary magnetic heads which can be practically mounted on the rotor drum is limited.

SUMMARY OF THE INVENTION

An object of this invention is to provide a magnetic recording/reproducing apparatus having a broad-band and high S/N reproducing amplifier system and a small-sized rotary cylinder unit.

Another object of this invention is to freely increase the number of rotary magnetic heads without increasing the number of channels and the cross-talk of the rotary transformer.

These and other objects can be achieved by a magnetic recording/reproducing apparatus having a cylinder unit comprising a rotor drum, a stator drum and a rotary transformer for electromagnetically coupling the rotor drum and the stator drum, wherein the rotor drum has the following mounted thereon: a plurality of rotary magnetic heads for recording and reproducing video signals; an amplifying means for amplifying signals reproduced by the plurality of rotary magnetic heads; recording/reproducing mode switching means for coupling the plurality of rotary magnetic heads to the amplifying means and the amplifying means to the rotary transformer during reproducing mode, and coupling the rotary transformer to the plurality of rotary magnetic heads and isolating the amplifying means from the plurality of rotary magnetic heads during recording; a head selecting means for selecting one rotary magnetic head for among the plurality of rotary magnetic heads; a control means for producing control signals for controlling the mode switching means and the head selecting means from a control signal transmitted from the stator drum through the rotary transformer; and a power source for producing a DC (direct current) voltage for energizing all of the above said means from the control signal transmitted from the stator drum through the rotary transformer.

The above and other objects and features of this invention will become apparent from consideration of the following description taken together with the accompanying drawings in which:

DESCRIPTION OF THE PREFERRED EMBODIMENTS

Hereinafter, we will describe in detail examples of this invention with the aid of the accompanying drawings.

Figure 1:
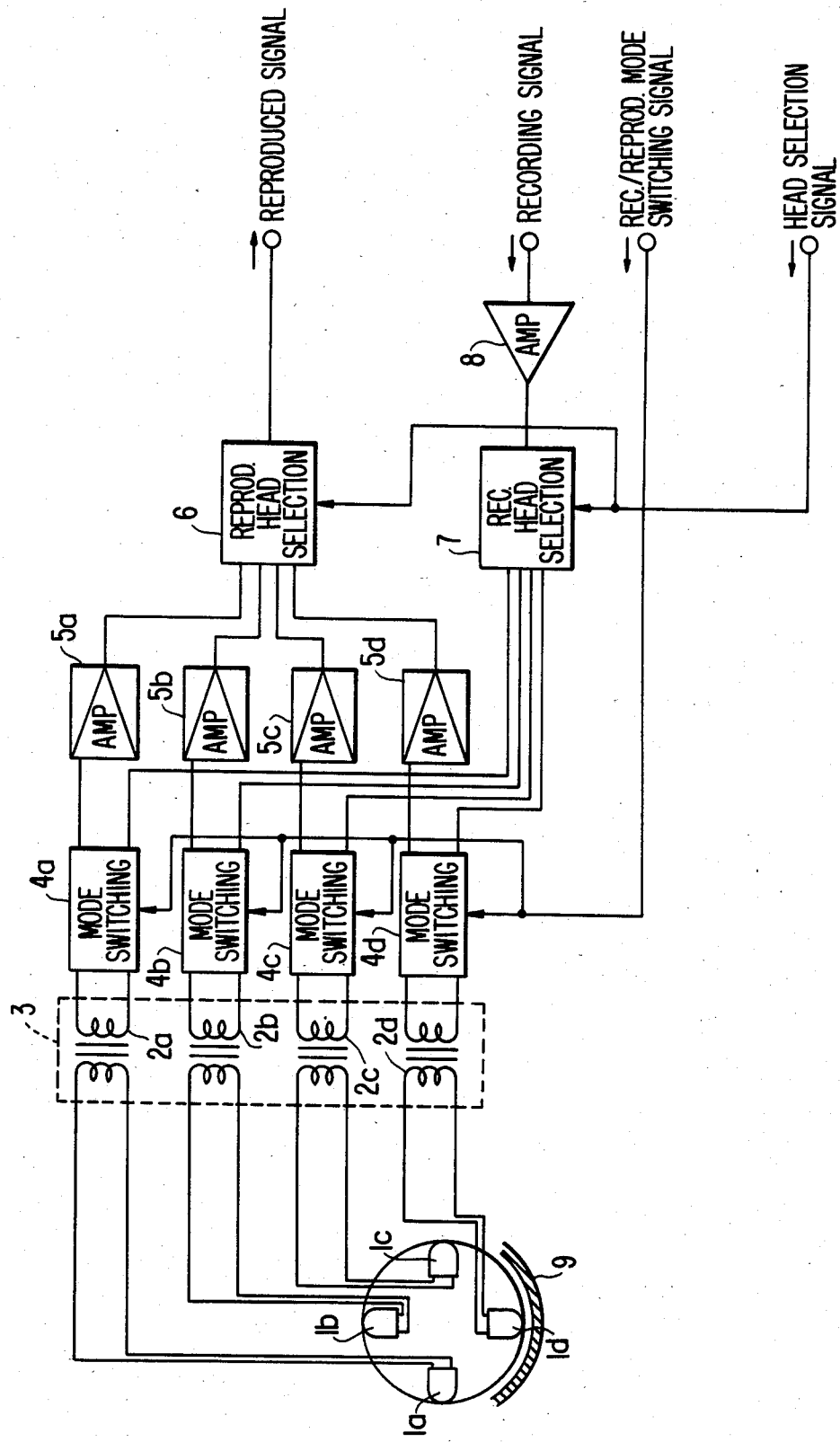
FIG. 1 is a basic block diagram of a conventional magnetic recording/reproducing apparatus.
Figure 2:
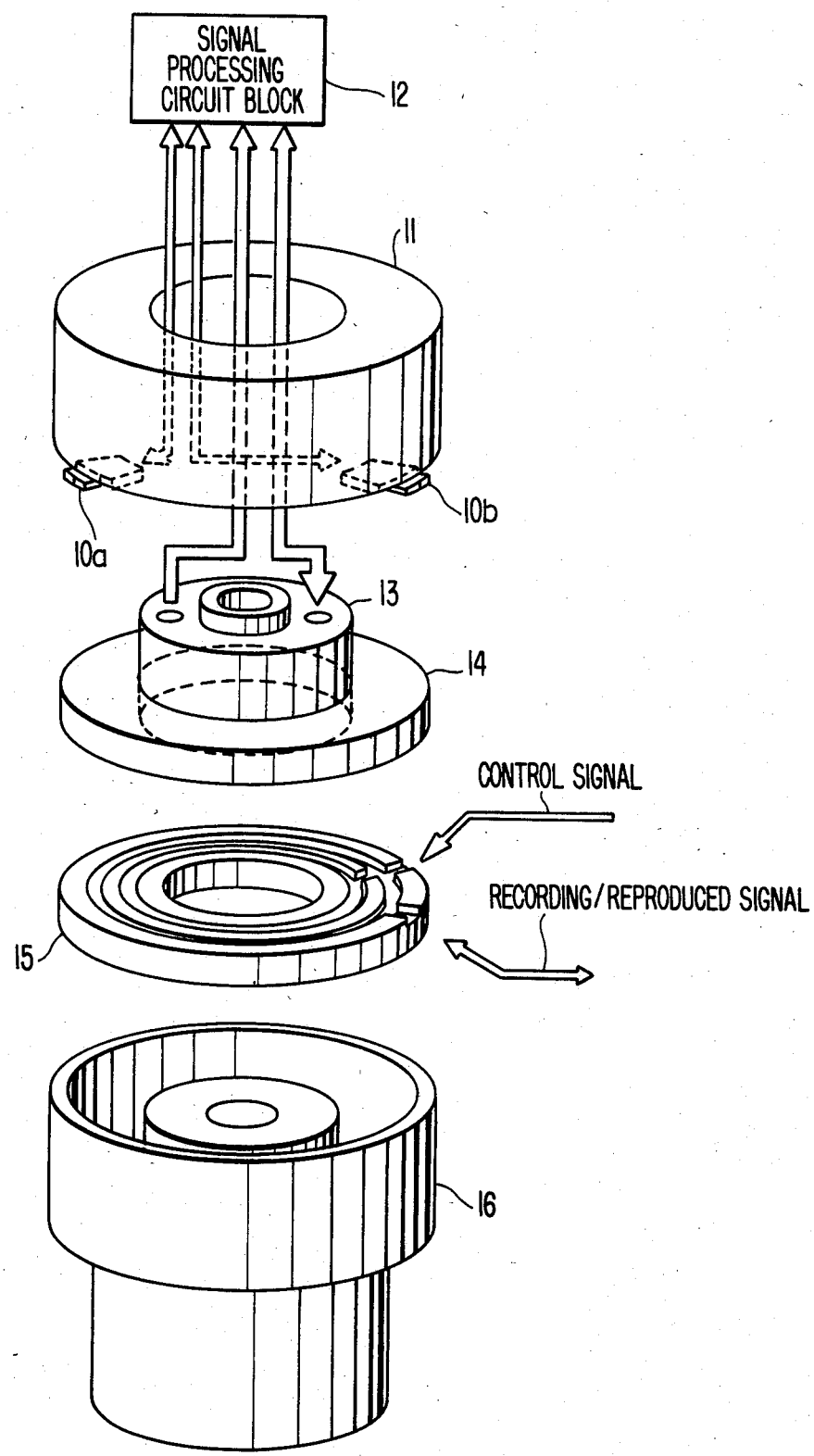
FIG. 2 is an exploded perspective view showing an embodiment of a cylinder unit of this invention.

FIG. 2 shows an exploded perspective view of an embodiment of a cylinder unit of this invention. In FIG. 2, 10a, 10b are rotary magnetic heads mounted on a rotor drum 11. Element 14 is the rotor side of a rotary transformer, which is fixed to the rotor drum 11 with the rotary disk 13. Element 15 is the stator side of the rotary transformer, which is fixed to a stator drum 16. Signals are transmitted between the rotor side 14 of the rotary transformer and the stator side 15 of the rotor transformer. The gap between the rotary and stator sides is about 100 μm. Element 12 is a signal processing circuit on the rotor drum 11, for amplifying signals and selecting the recording/reproducing head.

Figure 3:
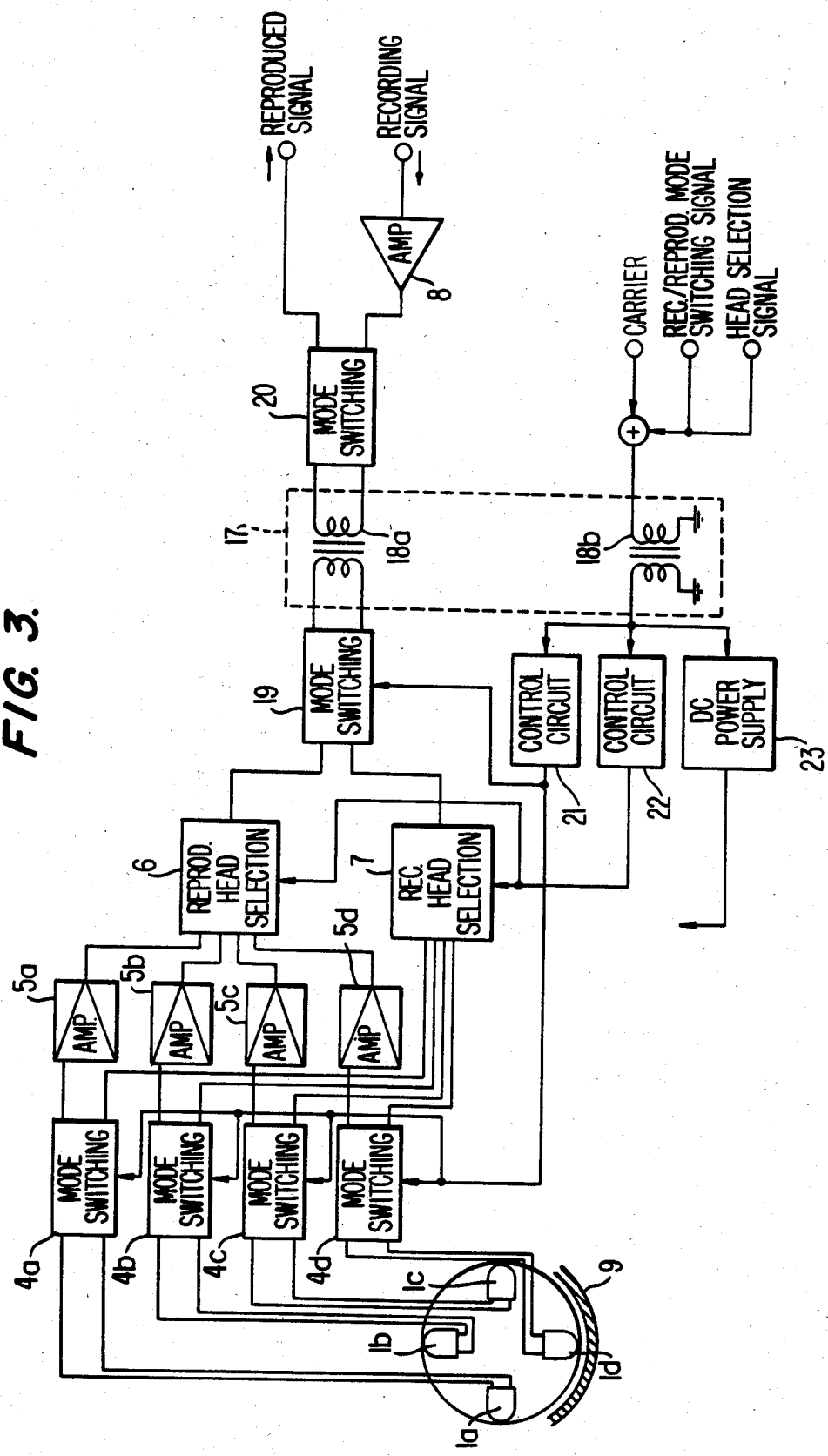
FIG. 3 is a block diagram showing an embodiment of a magnetic recording/reproducing apparatus of this invention.

FIG. 3 shows a basic block diagram showing an embodiment of a magnetic recording/reproducing apparatus of this invention. In FIG. 3, 1a-1d are rotary magnetic heads. A rotary transformer 17 consists of two channels 18a and 18b. The channel 18a transmits the recording and reproduced signals between the rotor side and the stator side, and the channel 18b transmits both a carrier signal and a control signal for selecting a head and switching the recording/reproducing mode.

Recording/reproducing mode switching circuits 4a-4d and 19, the reproducing amplifiers 5a-5d, the reproducing head selection circuit 6 and the recording head selection circuit 7 are located between the rotary magnetic heads 1a-1d and the rotor side of the channel 18a of the rotary transformer 17. The circuit connections of these circuit elements are the same as those shown in FIG. 1.

During the reproducing mode, the rotary magnetic heads 1a-1d are connected with the reproducing amplifiers 5a-5d by the mode switching circuits 4a-4d. The recording head selection circuit 7 is disconnected from the rotary magnetic heads 1a-1d by the mode switching circuits 4a-4d. From among the reproduced signals amplified by the reproducing amplifiers 5a-5d, the specific signal is selected by the reproducing head selection circuit 6 and is transmitted to the circuit block at the stator side through the recording/reproducing mode switching circuit 19 and to the channel 18a of the rotary transformer 17. At this time, the recording head selection circuit 7 is disconnected from the channel 18a of the rotary transformer 17.

During the recording mode, the reproducing amplifiers 5a-5d are disconnected from the magnetic heads 1a-1d by the mode switching circuits 4a-4d and the recording signal transmitted through the channel 18a of the rotary transformer 17 is applied to the specific one of the magnetic heads 1a-1d through the mode switching circuit 19, the recording head selection circuit 7, and the specific one of the mode switching circuits 4a-4d. An alternating current signal containing the information for switching the recording/reproducing mode and selecting the specific head is transmitted through the channel 18b of the rotary transformer 17, and applied to a first and a second control circuits 21 and 22 generating control signals for mode switching and head selection, respectively. The first and second control circuits 21 and 22 are also mounted on the rotor drum.

There is no power source on the rotor drum of the conventional magnetic recording/reproducing apparatus. However, the present invention needs a DC power source on the rotor drum as shown in FIG. 3, for supplying power to the circuits mounted on the rotor drum. The alternating signal transmitted through the channel 18b is supplied also to the DC power supply 23. The DC power supply 23 rectifies and smoothes the alternating signal to produce a DC voltage.

In this example, because the rotary magnetic heads and the signal processing circuits are closely mounted on the rotor drum, board band characteristics can be obtained. Furthermore, a high S/N can be realized because the signal reproduced by the magnetic head is transmitted through the rotary transformer after being amplified to an adequately high level. Also, since only one signal is transmitted through the rotary transformer, the number of channels of the rotary transformer need not be increased when the number of rotary magnetic heads is increased.

Next, an example of the alternating signal applied to the channel 18b will be described. The alternating signal is composed of a carrier, a recording/reproducing switching signal and a head selection signal. The frequency of the carrier is set at the lower portion of the transmittable frequency band of the rotary transformer. Here, in the magnetic recording/reproducing apparatus employing down-converted chrominance recording method, the frequency area during recording or reproducing is the down-converted chrominance signal and the frequency modulated luminance signal (usually, 200 KHz-5 MHz). In other words, a signal in the range of several hundreds KHz—several MHz is transmitted through the rotary transformer. Because of the construction of the rotary transformer, cross-talk between adjacent channels is unavoidable. In this case, it is desirable that the carrier frequency area of the alternating signal which is supplied to the DC power supply and the control circuits is set at a frequency outside the abovenoted frequency band.

The rotary transformer actually has a transmittable frequency band of 50 KHz—several MHz. Considering the above, the signal frequency area of the down-converted chrominance recording method and the transmitted character of the rotary transformer, when the reproducing amplifiers are put on the rotary drum, the frequency of the alternating signal which is supplied to the DC power supply on the rotary drum must be set at the low-band of the down-converted chrominance signal and within the transmittable band of the rotary transformer. Needless to say, the frequency of the alternating signal should be set below the lower frequency of the down-converted chrominance signal, if it is within the transmittable band of the rotary transformer.

In the description above, the down-converted chrominance recording method is explained as an example. But the above condition is applicable to other recording methods, for example, magnetic recording/reproducing apparatus which transmit the luminance signal and the chrominance signal through different channels of the rotary transformer.

Next, another example of this invention will be described with reference to FIG. 4.

Figure 4:
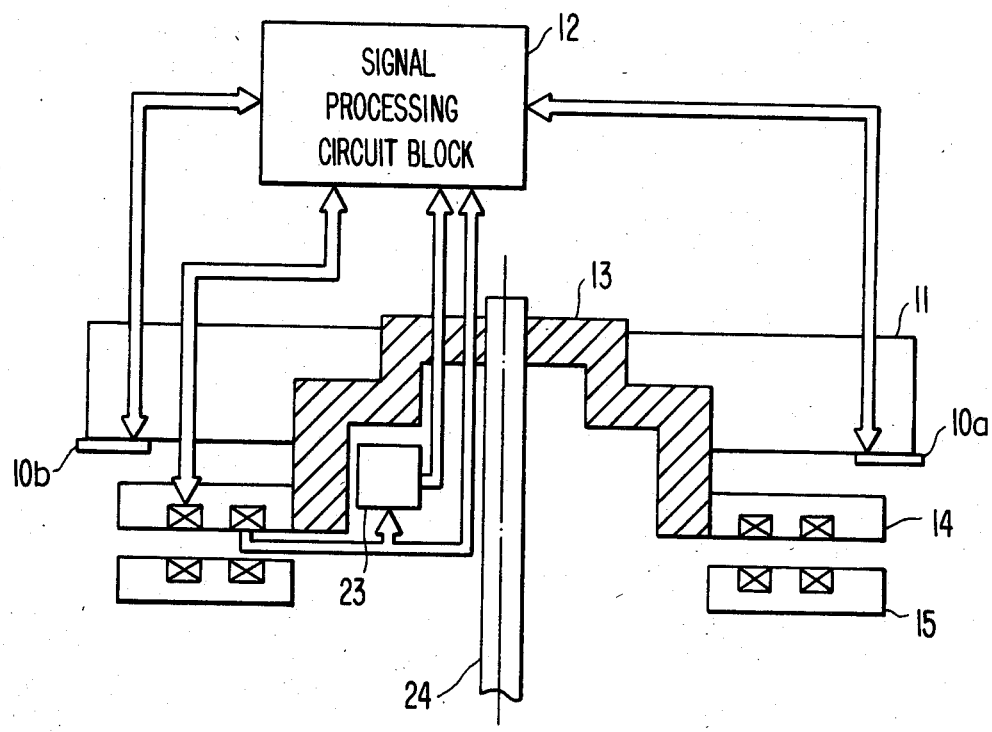
FIG. 4 is a sectional view of a rotor drum of this invention.

FIG. 4 shows a cross-sectional view of the rotor drum. In FIG. 4, the DC power supply 23 rectifies and smoothes the alternating signal transmitted from the stator drum side and produces a DC voltage, when harmonic wave signals can also be generated. The signal reproduced from the rotary magnetic heads 10a and 10b is several hundred $nV_{p-p}$, when the alternating signal is several $V_{p-p}$. Accordingly, the alternating signal can disturb the reproduced signal. For avoiding this disturbance, the DC power supply 23 is disposed inside the rotary disk so as to be shielded by the rotary disk so that the rotary magnetic heads will not suffer from the disturbance of the alternating signal.

Figure 5:
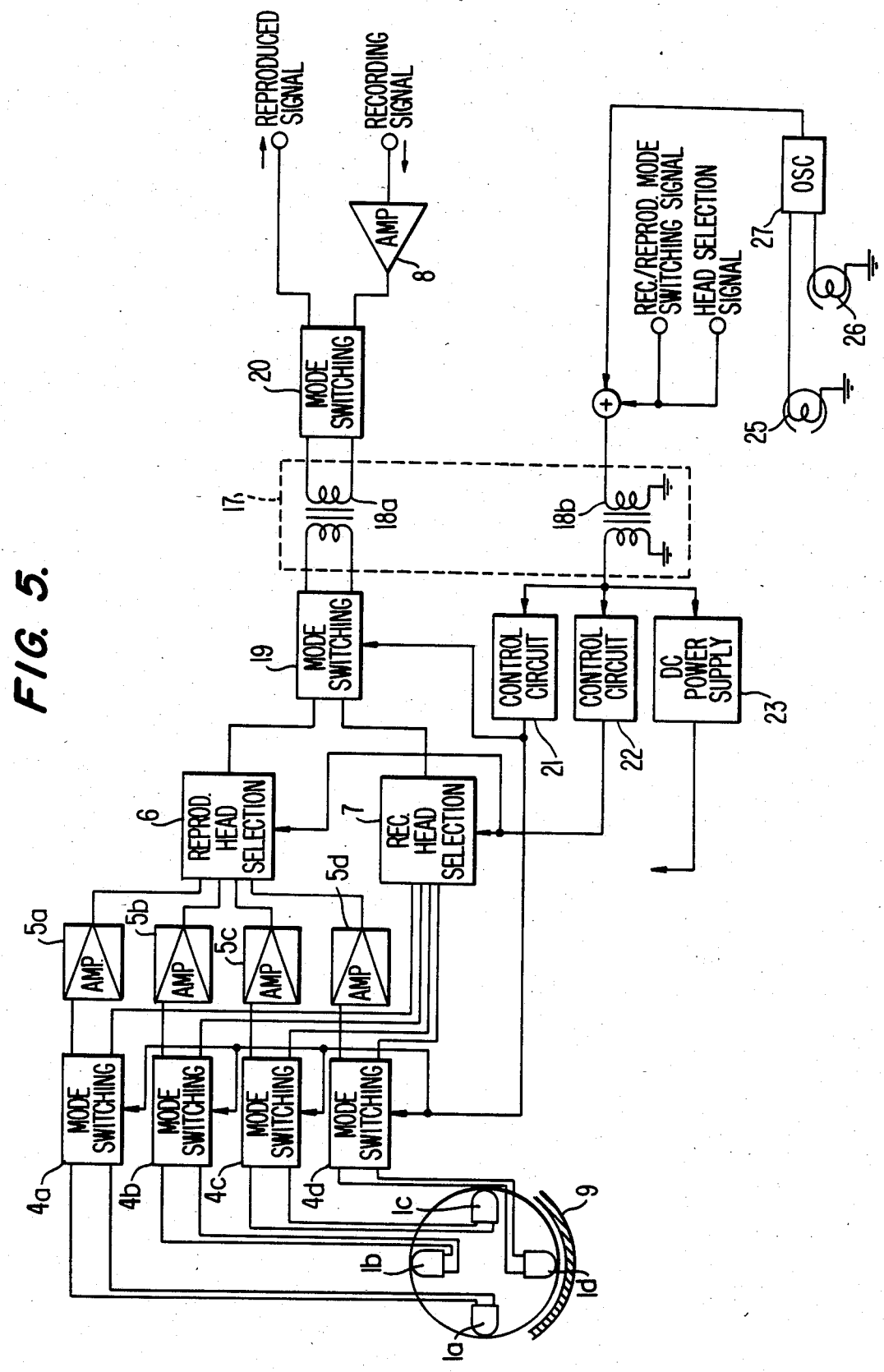
FIGS. 5-8 are block diagrams showing other embodiments of a magnetic recording/reproducing apparatus of this invention.

FIG. 5 shows a basic block diagram showing another embodiment of this invention. The output signal of an erase/bias oscillator 27 which supplies signals to an erase head 25 (fixed head) and an audio head 26 (fixed head) is used as the alternating signal transmitted to the channel 18b, and accordingly to the DC power supply 23 and the control circuits 21 and 22. This arrangement can simplify the circuit configuration. The erase/bias oscillator 27 supplies an erase current to the erase head 25 and a bias current to the audio head 26, for erasing recorded video and audio signals on the magnetic tape.

Generally, the oscillating frequency of the erase/bias oscillator 27 is 60 KHz–120 KHz which is several times the upmost frequency of audio signal. Since the transmittable frequency band of the rotary transformer 17 is 50 KHz —several MHz, the output signal (about 100 KHz) of the erase/bias oscillator 27 can be directly transmitted to the rotor drum side through the rotary transformer 17. Even if there is a cross-talk between the channels of the rotary transformer, the alternating signal will not disturb the reproduced video signal because the transmitted band of the video signal is 100 KHz–5 MHz.

Figure 6:
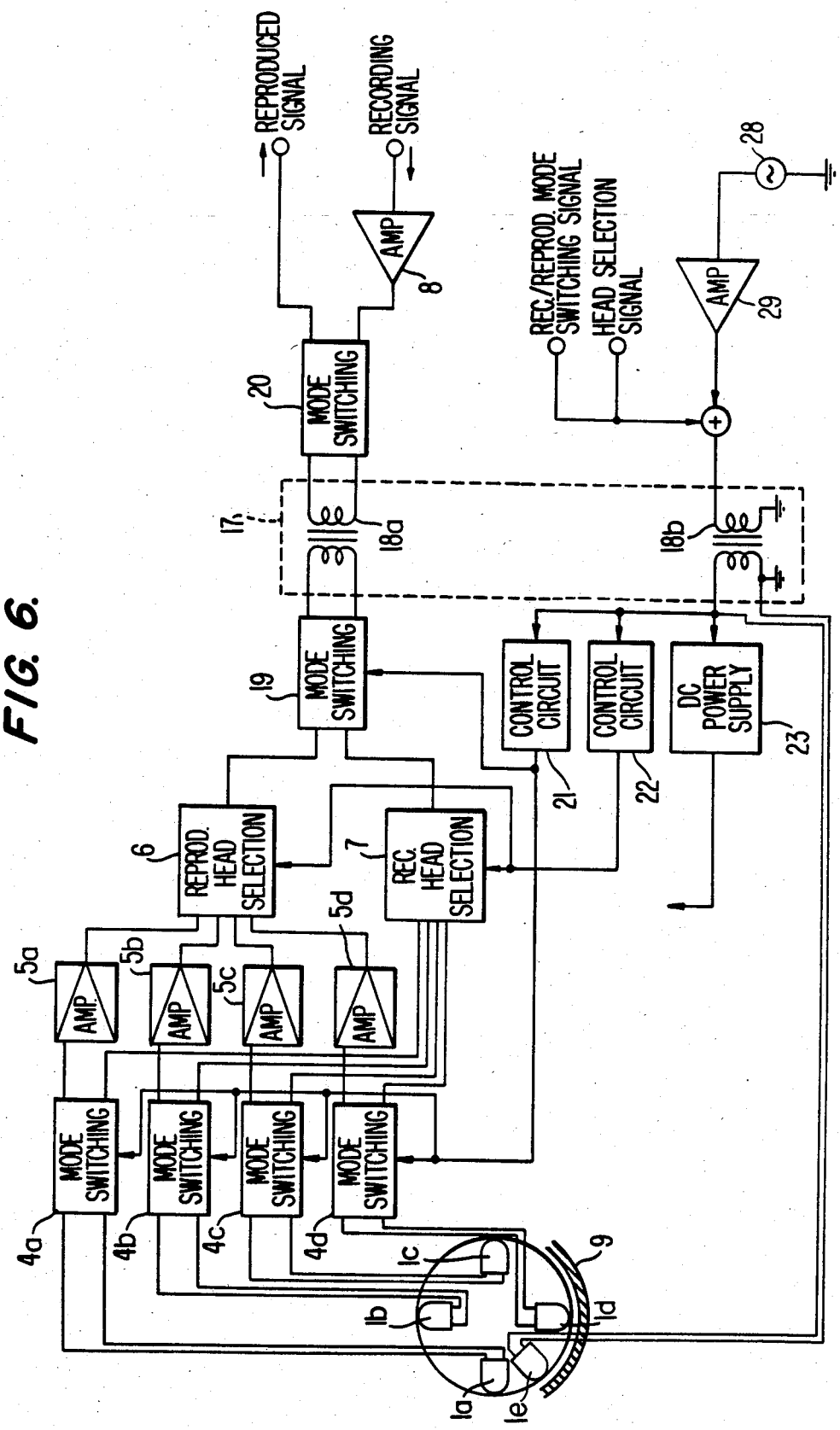

FIG. 6 shows a basic block diagram showing still another embodiment of this invention. The output signal of an oscillator 28 for a flying erase is used as the alternating signal transmitted to the DC power supply 23 and the control circuits 21, 22. This method also simplifies the circuit configuration. Element 1e is a rotary magnetic head for a flying erase, which usually has a gap several—ten times large as that of the recording/reproducing heads, and is supplied with a high frequency current of more than 4 MHz, so as to thereby erase video signals recorded on video tracks on the magnetic tape. In FIG. 6, the track width of the rotary magnetic head 1e for the flying erase is twice that of the rotary magnetic heads 1a–1d for recording/reproducing, so that the rotary magnetic head for the flying erase can erase two video tracks (corresponding to one frame) in one scan. In other words, by providing two rotary magnetic heads having the track width same as that of the recording heads, the recorded signals can be erased field by field (one field erase).

The output signal of the oscillator 28 for the flying erase is amplified by an amplifier 29 and transmitted to the rotary magnetic head 1e for the flying erase through the channel 18b of the rotary transformer 17. This alternating signal is also transmitted to the DC power supply 23, and converted to a DC voltage used as the supply voltage to the circuit elements on the rotor drum.

Figure 7:
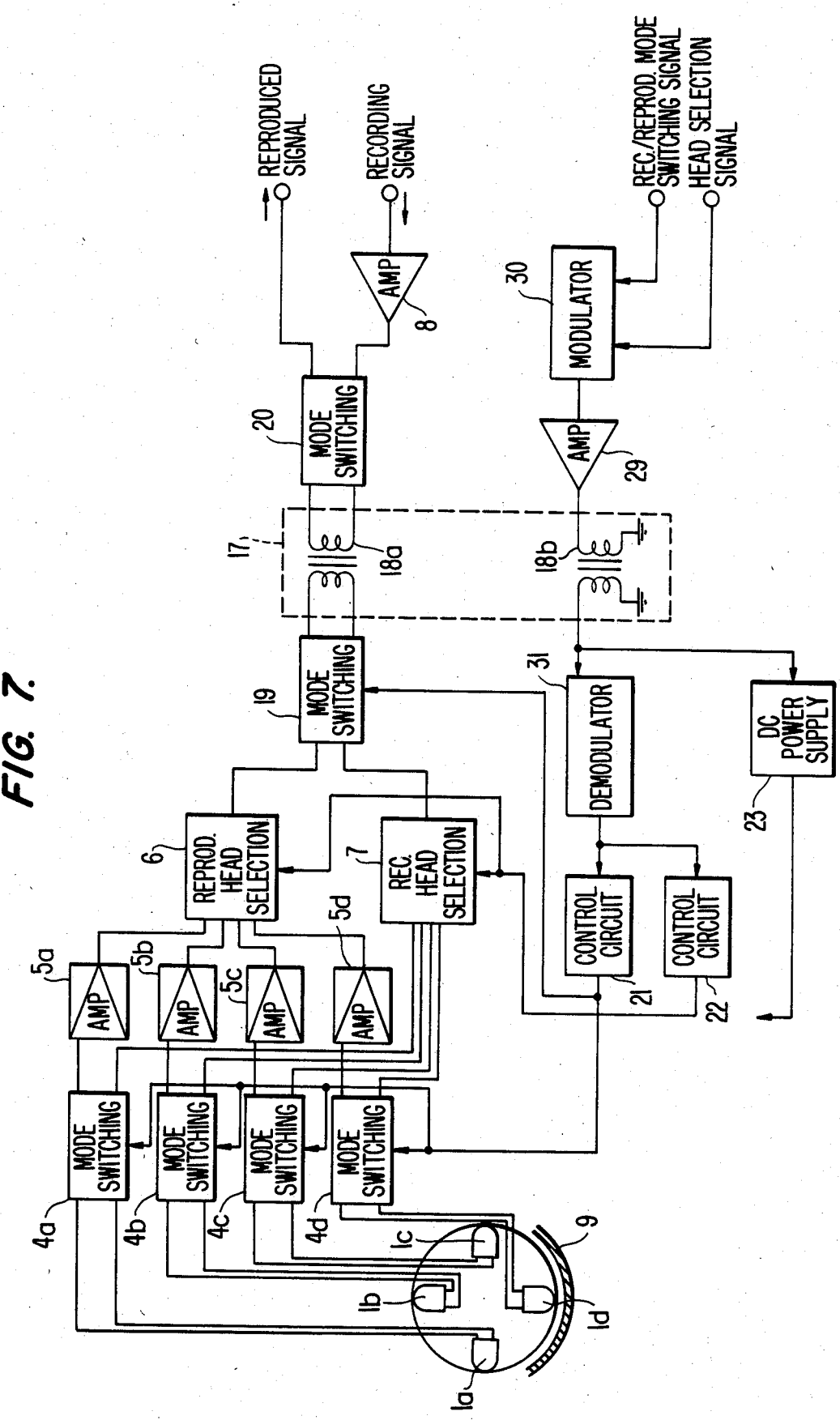

FIG. 7 shows a basic block diagram showing a further embodiment of this invention. Element 30 is a modulation circuit which generates a signal modulated by the recording/reproducing mode switching signal and the head selection signal. This modulated signal is amplified by the amplifier 29 and transmitted through the channel 18b to a demodulation circuit 31 which demodulates the modulated signal. In this case, if the frequency modulation system is employed, frequencies corresponding to recording and reproducing are assigned to carriers and frequencies corresponding to the rotary magnetic heads are assigned to the control signals. In other words, the alternating signal frequency-modulated by the control signal is amplified by the amplifier 29 and transmitted to the demodulation circuit 31 through the channel 18b of the rotary transformer 17. The control signal and the carrier which are demodulated by the demodulation circuit 31 are applied to the control circuits 21, 22 and the DC power supply 23, respectively. Accordingly, during the recording or reproducing mode, a specific head can be selected and the DC voltage can energize all of the circuit elements on the rotor drum.

In this embodiment, the case employing the frequency modulation method is explained, but other modulation methods, such as phase modulation, amplitude modulation, etc., can be employed.

Figure 8:
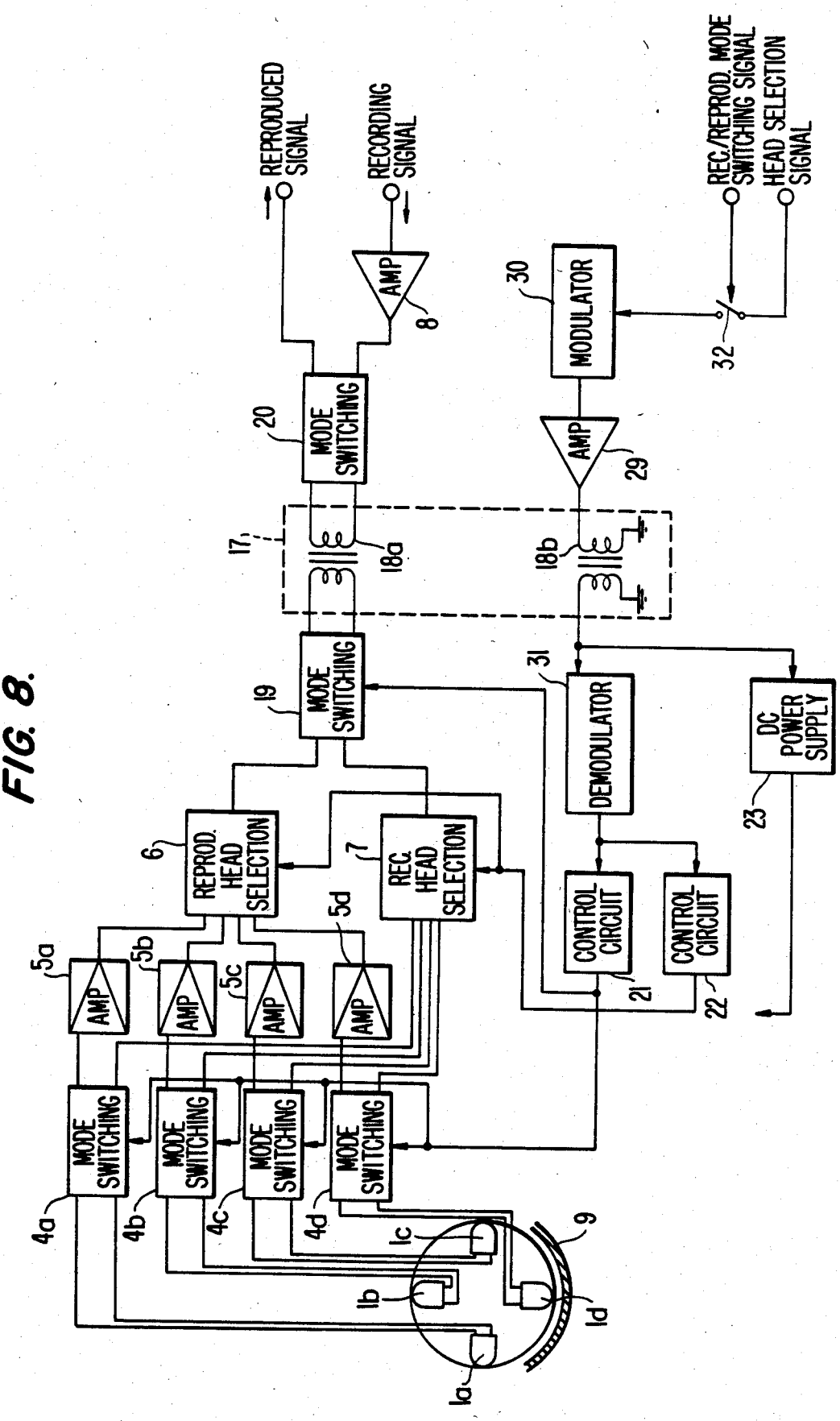

FIG. 8 shows a basic block diagram showing a still further embodiment of this invention. The basic configuration is the same as that of the embodiment shown FIG. 7, but it is different in that a switch 32 is connected to the modulation circuit 30 which switches the head selection signal according to the recording/reproducing mode switching signal. During the reproducing mode, the switch 32 turns on so that the alternating signal modulated by the head selection signal is transmitted through the channel 18b to the rotor drum side, and all of the circuits on the rotor drum are placed in the reproducing mode by the operation of the recording/reproducing mode switching circuit 21.

During the recording mode, the switch 32 turns off so that the unmodulated alternating signal is transmitted to the rotor drum side, and all of the circuits on the rotor drum are placed in the recording mode by the operation of the recording/reproducing mode switching circuit 21. In other words, determination of the recording and reproducing mode can be achieved simply by the ON-/OFF operation of the switch 32.

Figure 9:
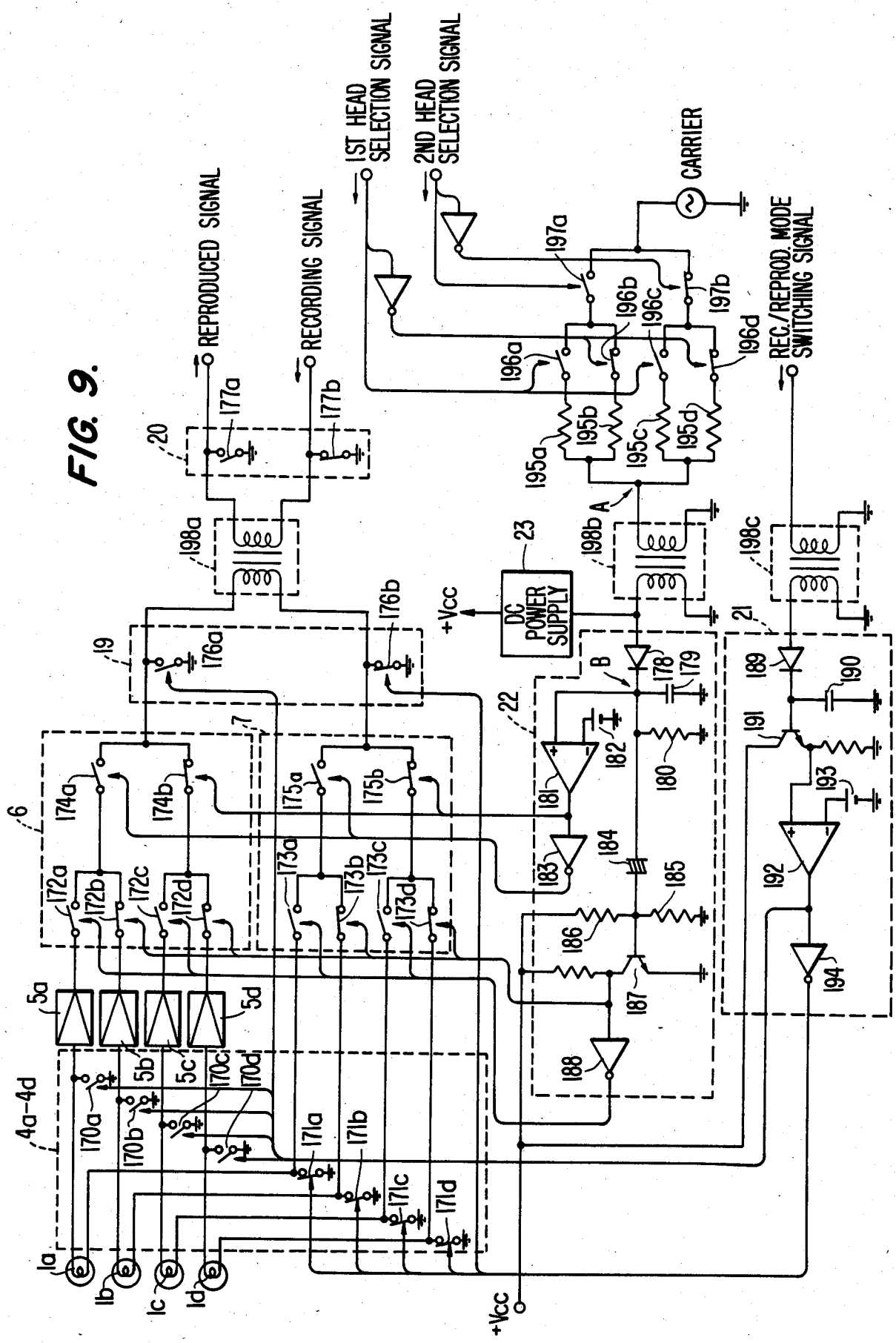
FIG. 9 is a circuit diagram showing an embodiment of this invention.

FIG. 9 is a detailed circuit diagram showing further another embodiment of the present invention. The circuits shown in FIG. 9 can be employed for all of the previously described embodiments with a simple modification, because most of the circuit arrangement in FIG. 9 is the same as that of the previously described embodiments except for the fact that the rotary transformer has a third channel 198c.

Referring to FIG. 9, the recording/reproducing mode switching circuits 4a–4d comprises switches 170a–170d and 171a–171b; the reproducing head selection circuit 6 comprises selection switches 172a–172d, 174a and 174b; and the recording head selection circuit 7 comprises selection switches 173a–173d, 175a and 175b. During the reproducing mode, the switches 170a–170d are OFF and the switches 171a–171d are ON, so that the reproduced signal from the rotary magnetic heads 1a–1d is applied to the reproducing amplifiers 5a–5d, and a specific signal is selected by the selection switches 172a–172d, 174a and 174b. During the recording mode, the switches 170a–170d are ON and the switches 171a–171d are OFF, so that the recording signal can be applied to a specific one of the rotary magnetic head 1a–1d selected by the selection switches 173a–173d, 175a and 175b.

Next, the control circuits for producing control signals for switching mode and selecting head will be described.

Figure 10:
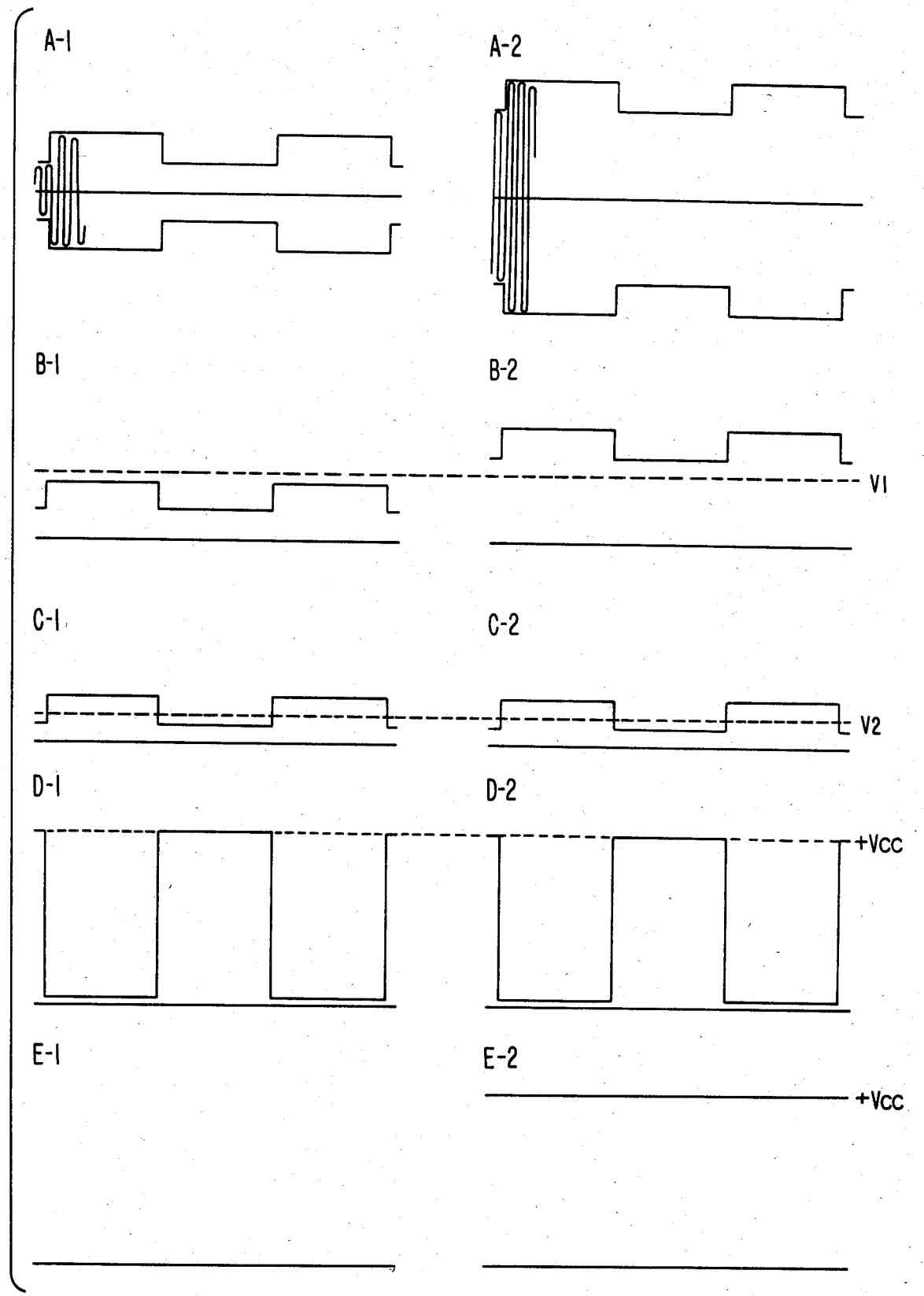
FIG. 10 shows waveform diagrams for explaining the operation of the embodiment shown in FIG. 9.

FIGS. 10 A-1 to E-1 and 10 A-2 to E-2 are waveform diagrams for explaining the operation of the control circuits in FIG. 9. The resistance values Ra, Rb, Rc, Rd of the respective resistors 195a–195d are selected to be Ra>Rb>Rc>Rd. Switches 196a, 196b, 197a, 197b are controlled by the first and second head selection signals. FIG. 10, A-1 and A-2 show the waveform at point A of the circuit shown in FIG. 1. FIG. 10 A-1 is the waveform when the selection switch 197a is ON and FIG. 10 A-2 is the waveform when the selection switch 197b is ON. Accordingly, an amplitude-modulated (AM) signal can be obtained from the carrier and the head selection signals. The AM signal is transmitted through the channel 198b of the rotary transformer and applied to a DC voltage generating circuit 16 and a head selection signal generating circuit 21. At the head selection signal generating circuit 21, the AM signal is detected by a diode 178, a capacitor 179 and a resistor 180 and the signal as shown in FIG. 10, B-1, B-2 can be obtained at point B in FIG. 9. Element 181 is a voltage comparator and 182 is a reference voltage source generating a reference voltage $V_1$. The voltage comparator 181 compares the signals shown in B-1 and B-2 with the reference voltage $V_1$ thereby to obtain the output signals as shown in FIG. 10, E-1 and E-2, respectively. Accordingly, the switches 174a–174d can be controlled by the second head selection signal given at the stator drum side. Element 183 is an inverter. The detected signal obtained through the capacitor 184 is amplified by a transistor 187 so as to thereby obtain the first head selection signal. The base of the transistor 187 is biased to be $V_2$ by resistors 186 and 185. The waveform at the base and the collector of the transistor 187 are shown in FIG. 10, C-1, C-2 and D-1, D-2, respectively. Element 188 is an inverter. Accordingly, the switches 172a–172d and 173a–173d can be controlled by the first head selection signal input at the stator drum side.

The recording/reproducing mode switching can be controlled by the signal transmitted through the channel 198c of the rotary transformer. The recording/reproducing mode switching signal input at the stator drum side is transmitted through the channel 198c to the control circuit comprising a diode 189, a capacitor 190 and a transistor 191 which detect the transmitted signal, a reference voltage source 193 and a voltage comparator 192 for comparing the detected signal level with the output signal level of the reference voltage source 193. The output signal of the comparator 192 controls the switches 170a–170d, 171a–171d and 176a, 176b. As described above, in this embodiment, the alternating signal (carrier) is amplitude-modulated by the head selection signals and transmitted to the rotor drum side circuits through the channel 198b of the rotary transformer, and the recording/reproducing mode switching signal is transmitted to the rotor drum side circuits through the channel 198c of the rotary transformer.

In the previous embodiments, the explanations are made in the case where four recording/reproducing rotary magnetic heads are employed, but it should be understood that the present invention can be applicable to the case where more than four recording/reproducing rotary magnetic heads are employed.

Furthermore, the recording/reproducing mode switching circuits 4a–4d can be replaced by a circuit which performs the mode switching and the head selection functions. In this case, the reproducing amplifiers 5a–5d can be replaced by a single amplifier, and the head selection circuits 6 and 7 can be removed, so as to thereby simplify the circuit configuration.

In view of the foregoing, it should be understood that various modification can be made without departing from the scope of the present invention described in the following claims.

What is claimed is:

1. A magnetic recording/reproducing apparatus having an oscillator for generating a carrier signal and a modulating means for modulating said carrier signal by a recording/reproducing mode switching signal and a head selection signal so as to thereby obtain a modulated signal; and a cylinder unit comprising a rotor drum, a stator drum and a rotary transformer for transmitting signals between the rotor and stator drums, wherein said rotary transformer has a first channel for transmitting video signals and a second channel for transmitting said modulated signal from said stator drum to said rotor drum and wherein said rotor drum comprises:

a plurality of rotary magnetic heads for recording and reproducing video signals;

an amplifying means for amplifying signals reproduced by said plurality of rotary magnetic heads;

a recording/reproducing mode switching means for coupling said plurality of rotary magnetic heads to said amplifying means and for coupling said amplifying means to said first channel of said rotary transformer during a reproducing mode, and coupling said first channel of said rotary transformer to said plurality of rotary magnetic heads and isolating said amplifying means from said plurality of rotary magnetic heads during a recording mode;

a head selecting means for selecting one rotary magnetic head from among said plurality of rotary magnetic heads;

a control means for obtaining said recording/reproducing mode switching signal and said head selection signal for controlling said mode switching means and said head selecting means, respectively, from said carrier signal of said modulated signal transmitted from said stator drum through said second channel of said rotary transformer; and a power source for prodcuing a DC voltage for energizing all of said means on said rotor drum from said modulated signal transmitted from said stator drum through said second channel of said rotary transformer.

2. An apparatus according to claim 1, wherein a frequency of said carrier signal is in a lower transmittable frequency band of said rotary transformer.

3. An apparatus according to claim 2, wherein said power source is located inside a rotary disk of the rotor drum so as to be shielded.

4. An apparatus according to claim 2, wherein said oscillator is an erase bias oscillator for supplying an erase signal to an erase head and an audio head.

5. An apparatus according to claim 2, further comprising a switching means for switching said head selection signal according to said recording/reproducing mode switching signal so that said head selection signal is not applied to said modulating means during said recording mode.

6. The apparatus according to claim 1, wherein said modulating means comprises a frequency modulator for modulating a frequency of said carrier signal by said recording/reproducing mode switching signal and said head selection signal.

7. An apparatus according to claim 1, wherein said modulating means comprises an amplitude modulator for modulating an amplifier of said carrier signal by said recording/reproducing mode switching signal and said head selection signal.

* * * * *